Patented June 19, 1934

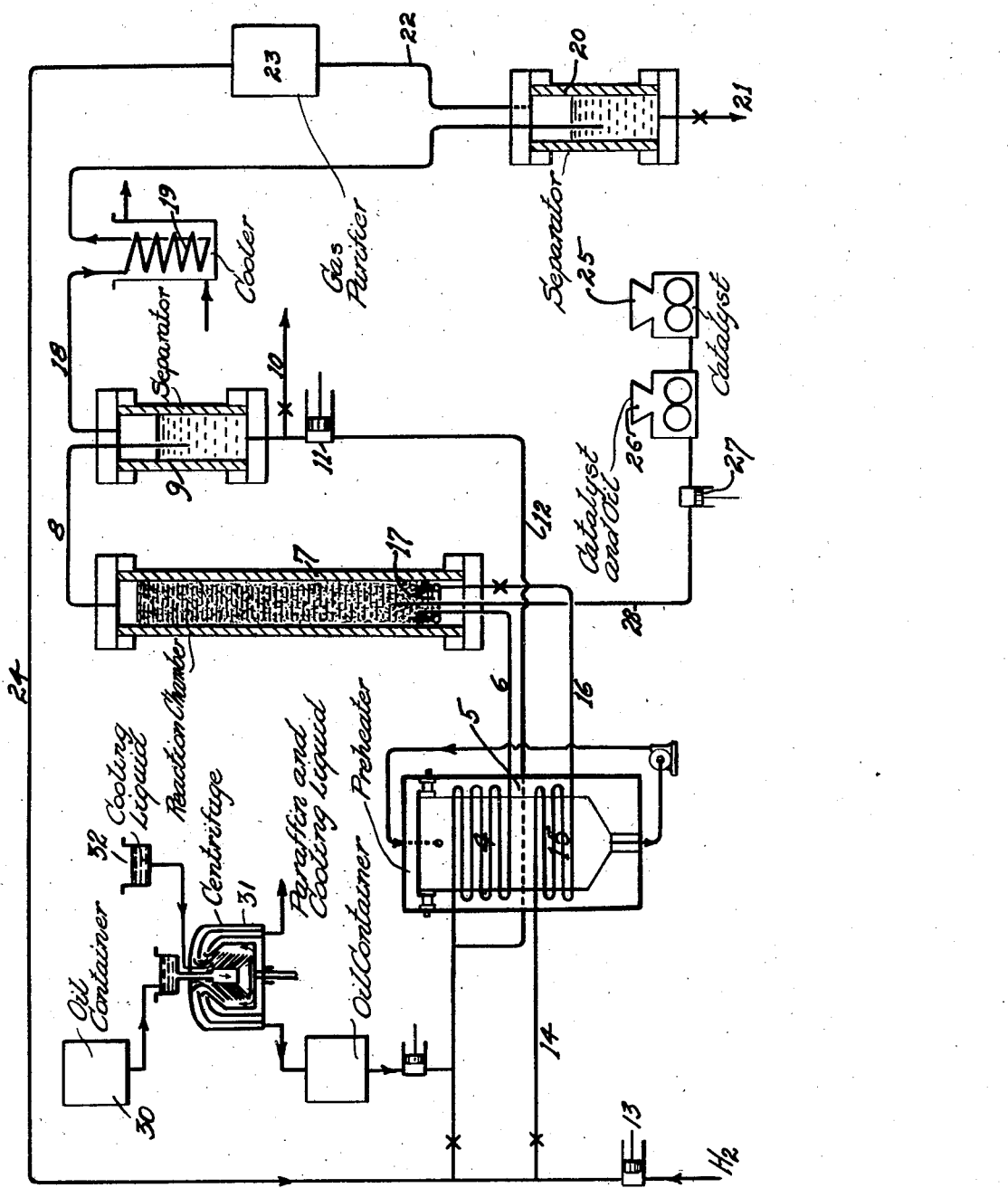

1,963,759

UNITED STATES PATENT OFFICE 1,963,759

VALUABLE HYDROCARBONS BY DESTRUCTIVE HYDROGENATION

Mathias Pier, Heidelberg, and Kurt Wissel, Ludwigshafen-on-the-Rhine, Germany, assignors to Standard-I. G. Company, Linden, N. J., a corporation of Delaware Application January 21, 1931, Serial No. 510,270
In Germany January 24, 1930

4 Claims. (Cl. 196—53)

This invention relates to improvements in the manufacture and production of valuable hydrocarbons from coal suspensions, tars, mineral oils, and the like by destructive hydrogenation.

A process has already been proposed for the manufacture and production of valuable hydrocarbons from carbonaceous materials in the liquid or suspended or pasty condition, such as coaloil suspensions, tars, mineral oils and the like by treatment in the liquid phase with hydrogen or gases containing hydrogen at elevated temperatures and increased pressures of more than 30 atmospheres, if desired in the presence of catalysts. In the said process such an intensive state of movement may be imparted to the material under treatment in all those parts of the apparatus, where it is subjected to heat treatment, that no injurious local thickening occurs, by vigorously stirring the said material by mechanical means so that a thorough intermixing of the materials essentially in upward-downward direction occurs and the hydrogenating gas may be simultaneously introduced into the body of liquid from a gas pipe by means bringing the gas into a fine state of division or into the form of fine jets, thus ensuring a good distribution of the hydrogenating gas in the product under treatment, the participants in the reaction being preferably admitted and removed in a continuous manner. The movement may be affected in various ways as for example by leading the products to be treated in the hot state in a cycle while stirring them or by leading them with a higher linear velocity through the reaction zone or with the aid of dredgers, scrapers, shovels and the like, the movement being carried out in such a manner that a thorough mixing of the reaction materials is effected. In this manner when employing catalysts, as for example in the form of fine to colloidal suspensions, these are always uniformly distributed in the liquid in the reaction chamber. A modification of this process has been described according to which instead of or in addition to the said means for maintaining the suspension of the catalysts, other means are employed which consists in reducing the difference in the specific gravities of the material to be treated and the catalyst to such an extent that a uniform distribution of the catalyst is always obtained.

We have now found that the settling of the dispersed catalyst present in the liquid initial materials comprising an asphaltic substance to be treated may be prevented by precluding the simultaneous presence in the reaction mixture of hydrocarbons rich in hydrogen, and in particular of hydrocarbons of the said nature, which have a high molecular weight. As a general rule the said hydrocarbons have a molecular weight of more than 250 and contain more than 10 or 11 per cent of hydrogen. Thus in the treatment of liquid products containing asphaltic substances which expression, where herein employed includes resinous substances, and which contain a solid catalyst in a state of dispersion, the settling of the catalyst is prevented by taking care that substances having a flocculating action, in particular products rich in hydrogen as for example paraffinic hydrocarbons are excluded and that an enrichment in such substances is precluded. In this case also hydrocarbons rich in hydrogen of low molecular weight should be particularly excluded. All the asphaltic substances of the character defined are flocculated by the hydrocarbons rich in hydrogen referred to, the flocculating action of the low molecular weight hydrocarbons being stronger than that of the high molecular weight hydrocarbons, but the latter having a pronounced flocculating action when present in sufficient concentration. It has been found in the treatment of substances of the said kind that an enrichment of the liquid in the reaction vessel with hydrocarbons rich in hydrogen effects a flocculation of the asphaltic and resinous substances which are dissolved at the working temperatures employed and a conglomeration of the fine particles of catalyst with the flocculated substances takes place. The catalyst then collects at the bottom of the reaction vessel so that its activity is partially or wholly lost and clogging and incrustations may take place in the apparatus. In order to avoid this, the initial materials are freed according to their nature from low boiling constituents rich in hydrogen before their employment by vacuum distillation, or in cases when the said constituents are formed during the heating period, they are removed at a suitable place before their entry into the reaction vessel. Furthermore, the low boiling products rich in hydrogen formed in the reaction vessel during the process, such as middle oils and benzines, are removed from the reaction vessel immediately after their formation by the choice of a corresponding linear velocity of flow of the hydrogenating gas so that they have no opportunity to act on the liquid present in the reaction vessel.

In this way the enrichment of the reaction mixture in hydrocarbons rich in hydrogen is precluded because most of the high boiling hydrocarbons are unsaturated in nature and, while the removal of the low boiling hydrogen rich hydrocarbons is accompanied by a removal of low boiling unsaturated hydrocarbons, the concentration of hydrogen rich hydrocarbons in the entire reaction mixture decreases.

Care should also be taken that the high molecular substances, such as paraffin hydrocarbons, which are present in the initial materials or which are formed during the hydrogenation, and which likewise effect a flocculation of the catalyst, are excluded to a large extent. In this case it is preferable to withdraw a part of the liquid material to be treated periodically or continuously from the reaction chamber, to remove the high molecular constituents rich in hydrogen, as for example by freeing from paraffins by cooling and subsequent centrifuging, and to return the remainder to the reaction chamber. In this manner the concentration of high molecular products rich in hydrogen in the reaction liquid is kept very small so that the catalyst remains suspended.

Again when working up high molecular products rich in hydrogen, such as paraffins or bituminous substances, the hydrocarbons containing asphaltic substances, such as mineral coal tar products, must be excluded in the same way because in this case they also have a flocculating effect on the suspension of the catalyst.

All those catalysts usually employed in destructive hydrogenation processes, which are immune from poisoning by sulphur, and in particular such comprising a metal of the sixth group of the periodic system in a free or combined state such as molybdenum, tungsten or chromium may be employed.

The process is preferably carried out under pressures exceeding 20 atmospheres, and preferably at high pressures exceeding 50 atmospheres, as for example at 100, 200, 500, 800, 1000 atmospheres or even more. Temperatures of between 300° and 700° C. are usually employed, but usually temperatures of between 380° and 550° C.

One method for carrying out the invention will be described with reference to the accompanying drawing, but the invention is not restricted to this particular method or the particular arrangement shown.

Crude oil containing asphaltic substances and hydrogen rich hydrocarbons of high molecular weight, particularly paraffin wax, is led from container 30 into a centrifuge 31 into which is also introduced a cooling liquid from tank 32. After being freed by filtration from the heavy paraffins which were precipitated by the cooling liquid, the oil is fed to storage tank 1. By means of pump 2 the initial material can be passed through line 3 and coil 4 which is placed in the preheater 5. Pipe 6 connects coil 4 with the high pressure reaction vessel 7. 8 is a pipe for leading the products from vessel 7 to the separator 9 from which liquid products can either be withdrawn through line 10 for any purpose or from which the said liquid products can be returned by means of pump 11 through line 12 to coil 4. Fresh hydrogen can be pumped by pump 13 through line 14 to heating coil 15 arranged in the preheater 5. Coil 15 is connected by pipe 16 with the device 17 for spraying the hydrogen into the material in the reaction vessel 7. The above mentioned separator 9 is connected by means of pipe 18 with the cooler 19. The portions liquefied in 19 are separated in the separator 20 from which they can be withdrawn through line 21 while gases pass through pipe 22 to a gas purifying system 23 from where the purified gas is returned through line 24 to the coil 4 through which it passed together with the liquid material, or to coil 15. 25 is a mill for grinding the catalyst. The mill 26 is suitable for mixing the catalyst with a suitable oil poor in hydrogen, preferably a part of the product to be treated. By means of pump 27 the mixture can be forced through line 28 into the reaction vessel 7.

The following examples will further illustrate the nature of this invention, but the invention is not restricted to these examples. The parts are by weight.

*Example 1*

Referring to the accompanying drawing, a brown coal low temperature carbonization tar is completely freed from paraffin wax by cooling in stages and filtering and stored in tank 1 after distilling off the constituents boiling below 325° C. The stored product contains about 15 per cent of asphalt. It is pumped by pump 2 through line 3 into the coil 4, arranged in preheater 5, where it is preheated to about reaction temperature. Recovered hydrogenating gas is mixed with the product before coil 4. The heated mixture passes through line 6 into vessel 7. Here the material is hydrogenated under 200 atmospheres at 450° C. in the liquid phase. A catalyst consisting of molybdic acid and zinc oxide which has been colloidally ground in mill 25 and mixed with a part of the product to be treated in mill 26 is added to the contents of the reaction vessel. The mixture is pumped by means of pump 27 through line 28 into vessel 7. The product to be treated contains about 20 per cent of catalyst. The hot reaction products pass through pipe 8 to the separator 9. Part of the liquid products separated therein can be withdrawn through line 10. Preferably, however, it is pumped by pump 11 back to the preheated coil 4. By circulating the hot contents of the reaction vessel by pumping, such a velocity of flow is maintained that no sedimentation of the suspended catalyst or the high molecular asphalt takes place. Furthermore, about 4 cubic metres of hydrogen to each kilogram of oil must be introduced so that the reaction products rich in hydrogen are continuously removed and have no opportunity to exert a flocculating action on the liquid containing asphalt in the high-pressure vessel by reason of its remaining therein for long periods of time. This is effected by introducing fresh hydrogen by pump 13 through line 14, coil 15, line 16 and spraying device 17 and by recycling hydrogenating gas purified in 23 through line 24. The vaporous products leaving the vessel 9 together with the hydrogen contain 15 per cent of motor benzine and 80 per cent of middle oil boiling up to 325° C. As far as these liquid products are not removed in separator 9, they pass through pipe 18, are cooled in cooler 19, separated in 20 and withdrawn through 21. The fixed gases pass through line 22 to the gas purification device 23.

*Example*

A mixture of 2 parts of brown coal tar and 1 part of mineral coal tar is distilled to a temperature of 400° C. in order to remove the asphalt. The fraction free from asphalt is treated with hydrogen at 475° C. under a pressure of 200 atmospheres in the presence of a catalyst prepared from molybdic acid, chromic acid and manganese carbonate. The catalyst is maintained in a state of fine distribution in a concentration of from 15 to 20 per cent in the liquid situated in the high pressure vessel by continuously circulating the same. A product is obtained which consists of 25 per cent of non-knocking motor benzine and 75 per cent of middle oil.

What we claim is:—

1. In the destructive hydrogenation of a liquid carbonaceous material comprising paraffinic hydrocarbons and asphaltic substances and containing a solid catalyst immune to sulphur poisoning in a state of suspension, the steps of preventing the settling of the catalyst by flocculation of the asphaltic substances by adjusting the concentration of the paraffinic hydrocarbons in the initial material to a point where they will not cause flocculation of asphalt by removal of any paraffins in excess of this concentration before introduction of the initial material into the reaction vessel and preventing an increase in the concentration of paraffinic hydrocarbons in the reaction vessel by removing low boiling paraffins as soon as formed and, in the event that the concentration of high boiling paraffins becomes too great, removing a portion of the reaction mixture, separating the paraffins therefrom and returning the paraffin free material to the reaction vessel.

2. In the destructive hydrogenation of a liquid carbonaceous material comprising paraffinic hydrocarbons and asphaltic substances and containing a solid catalyst immune to sulphur poisoning in a state of suspension, the steps of preventing the settling of the catalyst by flocculation of the asphaltic substances by adjusting the concentration of the paraffinic hydrocarbons in the initial material to a point where they will not cause flocculation of asphalt by removal of any paraffins in excess of this concentration before introduction of the initial material into the reaction vessel and preventing an increase in the concentration of paraffinic hydrocarbons in the reaction vessel by removing low boiling paraffins as soon as formed by employing a high rate of flow of the hydrogenating gas and, in the event that the concentration of high boiling paraffins becomes too great, removing a portion of the reaction mixture, separating the paraffins therefrom and returning the paraffin free material to the reaction vessel.

3. In the destructive hydrogenation of a liquid carbonaceous material comprising paraffinic hydrocarbons of high molecular weight and asphaltic substances and containing a solid catalyst immune to sulphur poisoning in a state of suspension, the steps of preventing the settling of the catalyst by flocculation of the asphaltic substances by adjusting the concentration of the heavy paraffinic hydrocarbons in the initial material to a point where they will not cause flocculation of asphalt by a removal of any heavy paraffins in excess of this concentration before introduction of the initial material into the reaction vessel and preventing an increase in the concentration of paraffinic hydrocarbons in the reaction vessel by removing low boiling paraffins as soon as formed and, in the event that the concentration of high boiling paraffins becomes too great, removing a portion of the reaction mixture, separating the paraffins therefrom and returning the paraffin free material to the reaction vessel.

4. In the destructive hydrogenation of brown coal low temperature tar rich in asphaltic substances and containing paraffin wax, the steps of reducing the concentration of the paraffin wax in the initial material below the point at which it can cause flocculation of the asphaltic substances contained therein by cooling the tar and filtering, adding a colloidally ground catalyst comprising molybdic acid and zinc oxide to the residual tar, and destructively hydrogenating the mixture thus obtained with a strong stream of hydrogen under a pressure of about 200 atmospheres and at a temperature of about 450° C., whereby any low boiling paraffinic hydrocarbons are immediately removed from the reaction vessel, and maintaining the reaction materials in a vigorous state of motion whereby settling of the catalyst is prevented.

MATHIAS PIER.
KURT WISSEL.